United States Patent [19]
Onandia

[11] Patent Number: 5,449,873
[45] Date of Patent: Sep. 12, 1995

[54] WIRE-TRACTION MECHANISM FOR ELECTROEROSION MACHINES

[76] Inventor: Jose M. Onandia, Eguzkitza, s/n., 48200 Durango-Vizcaya, Spain

[21] Appl. No.: 207,567
[22] Filed: Mar. 4, 1994
[51] Int. Cl.⁶ .............................................. B23H 7/10
[52] U.S. Cl. ................................................. 219/69.12
[58] Field of Search ............... 219/69.12; 226/189, 226/190; 204/224 M

[56] References Cited

U.S. PATENT DOCUMENTS 5,166,489 11/1992 Huff, Jr. et al. ................. 219/69.12

FOREIGN PATENT DOCUMENTS 63-180421 7/1988 Japan ................................ 219/69.12
2-48121 2/1990 Japan ................................ 219/69.12
2-59220 2/1990 Japan ................................ 219/69.12
3-111127 5/1991 Japan ................................ 219/69.12

Primary Examiner—Geoffrey S. Evans
Attorney, Agent, or Firm—Lucas & Just

[57] ABSTRACT

Wire-traction mechanism for electroerosion machines, wherein it is provided that the main wire-traction device is located in a lower head arranged under the immediate area of the piece to be machined and consists of a traction wheel, a first loose wheel and a second loose wheel, each joined to a pivoting arm, which arms are arranged 90° apart with respect to the traction wheel, the first and second free wheels being pressed against the traction wheel under the effect of a first and a second spring.

6 Claims, 1 Drawing Sheet

WIRE-TRACTION MECHANISM FOR ELECTROEROSION MACHINES

In wire electroerosion machines the wire typically is subject to numerous breaks, giving rise to technical and economic problems of maintenance, repair and amortization for machine downtime.

The applicant has observed that, to avoid undesirable vibrations which may increase breaking of the wire and defects in the piece to be machined, it is necessary to place the lower head with the main traction device as close as possible to and preferably immediately below the piece to be machined.

The present invention procures a wire-traction mechanism for electroerosion machines, which is characterized in that it is located in a lower head placed under the immediate area of the piece to be machined and which consists of a traction wheel, a first loose wheel and a second loose wheel, each joined to a pivoting arm, which arms are arranged 90° apart with respect to the traction wheel, the first and the second loose wheels being pressed against the traction wheel under the effect of a first and a second spring.

At the same time, the electrical contact between the current tap and the wire is improved.

It is likewise characterized in that in the lower head there are located at least four terminals, in correspondence with the coaxial transmission cables of the pulsed electric current, each terminal being in electrical continuity with the body of the said lower head, on which there is provided frontally on one of its bases a tap of conducting material having a prismatic shape of polygonal section with convex faces, rotatable on its shaft and invertible, the wire being supported on an arc on one of its faces.

Figure 1:
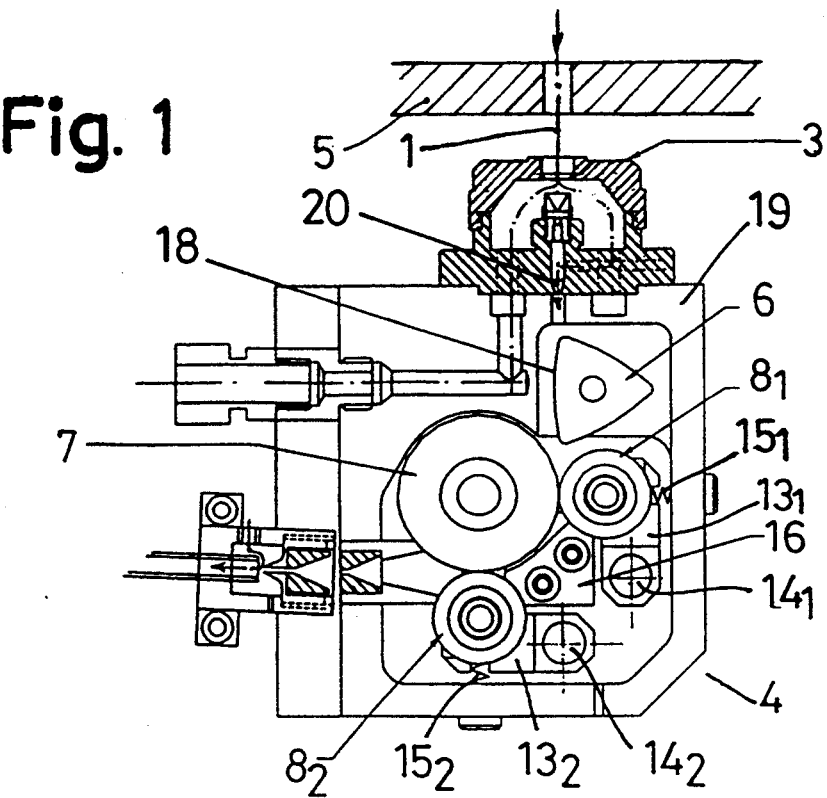
FIG. 1 is a sectional view of a practical embodiment of the device, subject of the invention.
Figure 2:
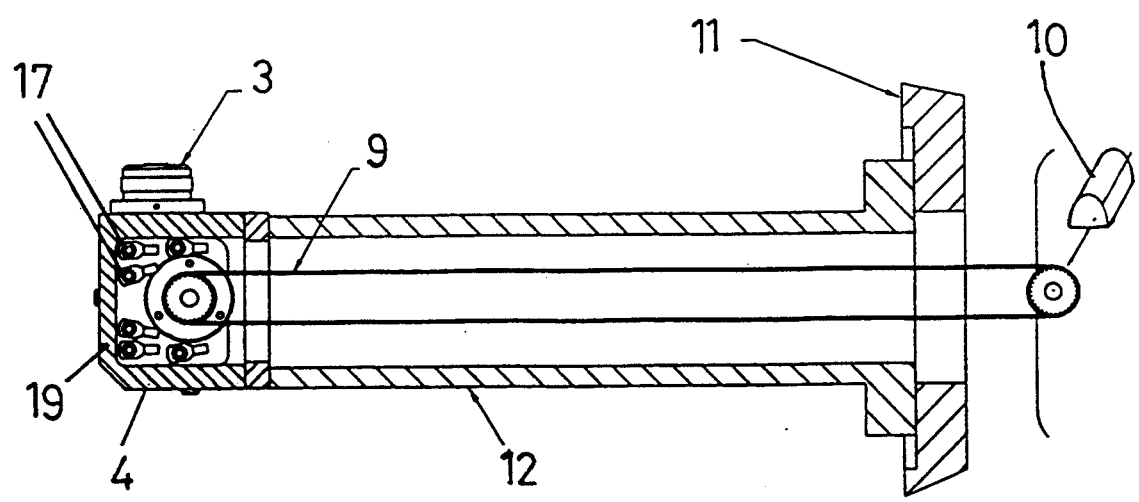
FIG. 2 is a view of the device of FIG. 1 together with the electroerosion machine.

The tap (6), preferably of tungsten carbide (Widia) has a prismatic shape with polygonal section and convex faces (18).

Contact between the conducting body (19) of the head (4) and the tap (6) is frontal, i.e., the base of the tap (6) against the body (19).

The wire (1) is not tangent to the contact face (18) but embraces it, so that the contact zone is not a point but is linear (contact arc), improving electrical contact.

To obtain the effect mentioned, the contact face (18) intersects the direction of the wire (1), which runs from upper guide (20) to the main drag zone.

The tap (6) is rotatable, so that each one of its faces is successively presented as contact face, and can be given a part-turn to present another base as contact with the body (19) and another zone of the face (18) for contact with the wire (1).

The wire (1) that comes from the upper head (not represented) passes through the workpiece (5) and reaches the lower head (4) arranged below in the vicinity of the said workpiece (5).

The wire (1), after passing through the corresponding cooling nozzle (3), comes into contact with the current tap (6).

To avoid peak intensity drops, the electric current is transmitted by five coaxial cables whose wires are connected to the piece (5) and terminals (17) of the lower head (4) and corresponding terminals of the upper head, which has its corresponding tap.

The wire (1) then enters the main drag zone, which consists of a drag wheel (7) and two loose wheels ($8_1$), ($8_2$) arranged preferably 90° apart with respect to the drag wheel (7).

The drag wheel (7) preferably will be of ceramic material and receives its torque by means of a belt (9) driven by a motor (10).

The lower head (4) is joined to the bed (11) of the machine by means of an arm (12) carrying the transmission belt (9).

The loose wheels ($8_1$), ($8_2$), by means of their arms ($13_1$), ($13_2$), pivot on the shaft ($14_1$), ($14_2$) against the action of the springs ($15_1$), ($15_2$) respectively, so that they press the wire (1) between them and the drag or traction wheel (7).

The surface of the first loose wheel ($8_1$) preferably is of elastic material, the surface of the second loose wheel ($8_2$) is of ceramic material and that of the drag wheel (7) is likewise ceramic, although they may be of other known materials.

It is provided that the force of the spring ($15_2$) on the second loose wheel ($8_2$) is greater than that exerted by the respective spring ($15_1$) on the first loose wheel ($8_1$), to prevent the wire (1) from separating from the traction wheel (7), thus improving conduction.

A guide chute (16) for the wire (1) is arranged between the two loose wheels ($8_1$), ($8_2$).

I claim:

1. Wire-traction mechanism for electroerosion machines, characterized in that it is provided that wire-traction device is located in a lower head positioned immediately below a work piece to be machined and comprises a body, a traction wheel, a first loose wheel and a second loose wheel, each joined to a pivoting arm, which arms are arranged 90° apart with respect to the traction wheel, the first and second loose wheels being independently pressed against the traction wheel under the effect respectively of a first and second spring.

2. Wire-traction mechanism for electroerosion machines, according to claim 1, characterized in that the surface of the first loose wheel is of elastic material.

3. Wire-traction mechanism for electroerosion machines, according to claim 1, characterized in that a guide chute for the wire is provided between the first and the second loose wheel.

4. Wire-traction mechanism for electroerosion machines, according to claim 1, characterized in that in the lower head there are located at least four terminals, in correspondence with the coaxial transmission cables for the pulsed electric current, each terminal being in electrical continuity with the body of said lower head and on which there is arranged frontally on one of its bases a tap of conducting material having a prismatic shape of polygonal section with convex faces, rotatable on its shaft and invertible, the wire being supported on an arc on one of its faces.

5. Wire-traction mechanism for electroerosion machines, according to claim 1, characterized in that there is provided a motor which transmits its torque to the traction wheel by means carried by an arm joining the lower head to the machine structure.

6. Wire-traction mechanism for electroerosion machines, characterized in that it is provided that a wire-traction device is located in a lower head positioned immediately below a work piece to be machined and comprises a body, a traction wheel, a first loose wheel and a second loose wheel, each joined to a pivoting arm, which arms are arranged 90° apart with respect to the traction wheel, the first and second loose wheels being independently pressed against the traction wheel under the effect respectively of a first and second spring and wherein the second spring, which presses the second loose wheel, exerts a greater pressure than the first spring on the first wheel.

* * * * *